United States Patent [19]

Takashima et al.

[11] Patent Number: 4,492,787
[45] Date of Patent: Jan. 8, 1985

[54] PROCESS FOR CONTINUOUSLY PRODUCING PROPYLENE-ETHYLENE BLOCK COPOLYMER

[75] Inventors: Ryokichi Takashima; Nobuaki Goko; Yumito Uehara; Yasuhiro Nishihara; Hidetoshi Yamamoto, all of Kurashiki, Japan

[73] Assignee: Mitsubishi Chemical Industries Limited, Tokyo, Japan

[21] Appl. No.: 413,159

[22] Filed: Aug. 30, 1982

[30] Foreign Application Priority Data

Sep. 18, 1981 [JP] Japan ................ 56-147581
Oct. 22, 1981 [JP] Japan ................ 56-169007

[51] Int. Cl.$^3$ .......................... C08G 297/08
[52] U.S. Cl. .................... 525/53; 422/132; 422/134; 422/135; 525/54; 525/323
[58] Field of Search .............. 525/53, 54, 323; 526/65

[56] References Cited

U.S. PATENT DOCUMENTS

| 3,345,431 | 10/1967 | Harban | 525/54 |
| 3,454,675 | 7/1969 | Scoggin | 525/53 |
| 3,776,979 | 12/1973 | Hill | 525/53 |
| 4,291,132 | 9/1981 | Clifford | 525/53 |
| 4,380,608 | 4/1983 | Hasvo et al. | 525/53 |

FOREIGN PATENT DOCUMENTS 106533 8/1980 Japan .
116716 9/1980 Japan .

OTHER PUBLICATIONS

Yoshioka and Hotta, *Kagaku Kogaku*, 19, 632, (1955).
D. Bradley, *Ind. Chemist*, Sep., 473, (1958).

*Primary Examiner*—Wilbert J. Briggs, Sr.
*Attorney, Agent, or Firm*—Oblon, Fisher, Spivak, McClelland & Maier

[57] ABSTRACT

The present invention relates to a process for producing a polypropylene-ethylene block copolymer by a continuous multi-stage polymerization comprising a first stage in which polypropylene is polymerized in a first polymerization vessel in the presence of a propylene polymerization catalyst, and a second stage in which propylene and ethylene are copolymerized in a second polymerization vessel, wherein the polypropylene slurry discharged from the first polymerization vessel is supplied to a concentrator to separate said slurry into a concentrated polypropylene slurry and a supernatant liquid, the concentrated polypropylene slurry is then introduced through an upper part of a hydraulic sedimentation classifier to be contacted with a countercurrent of the upward flowing of the supernatant fluid introduced through a lower part of said classifier to obtain hydraulically sedimented polypropylene, and non-hydraulically sedimented polypropylene; the thus obtained hydraulically-sedimented polypropylene is then supplied to the second polymerization vessel or to a further propylene polymerization vessel and the non-hydraulically sedimented polypropylene is then recycled from the classifier to the first polymerization vessel. The present process produces a propylene-ethylene block copolymer having excellent characteristics of cold shortness and high impact strength.

7 Claims, 5 Drawing Figures

PROCESS FOR CONTINUOUSLY PRODUCING PROPYLENE-ETHYLENE BLOCK COPOLYMER

BACKGROUND OF THE INVENTION

1. Field of the Invention

The present invention relates to a continuous process for producing a propylene-ethylene block copolymer. More particularly, it relates to a continuous process for producing a propylene-ethylene block copolymer having excellent characteristics of cold shortness and high impact strength which are the same or superior to those of a propylene-ethylene block copolymer obtained by a batch system.

2. Description of the Prior Art

A block co-polymerization of propylene and ethylene has been considered the best method to improve the impact strength under low temperature, which is considered a defect of a crystalline polypropylene.

The block co-polymerization of propylene and ethylene is usually conducted in such a manner that in the first place propylene is polymerized by a plurality of polymerization vessels connected in series and then the co-polymerization of propylene and ethylene is done in the presence of a comparatively large amount of ethylene.

When the polymerization is conducted continuously by using this type of the plurality of vessels connected in series, a certain distribution of the residence time occurs in the polymerization mixture because each vessel reactor is a so-called complete mixing type.

As a result, the effluent discharged from a preceeding vessel will contain various substance such as catalyst grains which are short-passed from the said vessel without giving any contribution to the polymerization, small size polymer grains which had not yet grown sufficiently, polymer grains having high molecular weight and/or larger size which had grown during the long stay in the vessel, etc.

When the effluent is supplied as it is to the vessel for the co-polymerization of propylene and ethylene, the resulting copolymer tends to have inferior impact strength under low temperature than those obtained by a batch process.

Besides, the copolymer will give moldings which are poor in appearance because of a gel formation caused by polymer grains short-passed from propylene polymerization vessel and/or polymer grains grown for a long time in the copolymerization vessel.

Various processes have been proposed to overcome the disadvantages in the continuous polymerization.

The processes using many reactors have been proposed in Japanese Examined Patent Publication No. 25585/1978 and Japanese Unexamined Patent Publication No. 53990/1974. In such processes, a block copolymer having physical properties similar to those of the batch process can be obtained, however, it causes higher cost of construction of the apparatus depending upon increase of the reactors to be uneconomical and it causes complicated quality control of the product.

The process adding an electron donor in the copolymerization of propylene and ethylene in the second step has been proposed in Japanese Examined Patent Publication No. 19542/1969 and Japanese Unexamined Patent Publication No. 115417/1980. Thus, the process has not been effective according to the studies.

The process for reducing a molecular weight of a propylene-ethylene copolymer in the second step has been proposed in Japanese Unexamined Patent Publication No. 61278/1974. The process causes inferior impact strength of the product according to the studies.

In Japanese Unexamined Patent Publication No. 106533/1980, a process is disclosed, in which the slurry in the first stage reaction vessel is discharged from the wall part of said vessel, the discharged slurry being washed co-currently with the same kind of fresh medium as the medium of said slurry to obtain a slurry having substantially less amount of small polymer grains than the original slurry and the slurry being supplied to the second stage reaction vessel.

However, the vessel preferably used in said process tends to cause a vortex, which causes a certain distribution of the grain concentration. Thus, the said process is not of much practical use.

Namely, the formation of a voltex causes not only to decrease the effective volume of the reactor but also to make liquid level control difficult and the distribution of polymer grains in the vessel causes to reduce actual residence time of the grains.

Further, in this process a stable operation cannot always be guaranteed because the polymerization does not proceed uniformly.

Thus, this process is quite difficult to adapt to the actual industrial production field.

There is a process proposed in Japanese Unexamined Publication No. 116716/1980 in which a slurry obtained from the propylene polymerization stage is continuously classified by using a centrifugal separator, a liquid cyclone etc. The slurry obtained by this process contains comparatively large polymer grains, which amount 70-97% of the total polymer obtained, is supplied to the vessel for the copolymerization of ethylene and propylene.

However, the inventors of the present invention have studied and found that the impact strength of the moldings obtained by this process tends to be low.

The inventors of the present invention have done intensive studies to solve the aforesaid problems and reached the present invention by having found that a certain classification system gives a remarkable effect.

SUMMARY OF THE INVENTION

The present invention provides a continuous process for producing a propylene-ethylene block copolymer by continuous multi-stage polymerization, in which propylene is polymerized in the presence of a propylene polymerization catalyst in a previous step, and then, propylene and ethylene are copolymerized, which comprises the polypropylene slurry discharged from the propylene polymerization vessel being supplied to a concentrator to separate said slurry to a concentrated slurry and a supernatant liquid, the concentrated polypropylene slurry thus obtained being supplied to an upper part of a hydraulic sedimentation classifier to be in contact countercurrently with the up-flow of said supernatant liquid supplied to a lower part of said classifier to recover hydraulicly sedimentated polypropylene, the polypropylene thus recovered being supplied to a subsequent propylene polymerization vessel or the vessel for copolymerization of ethylene and propylene, and the polypropylene which has not hydraulicly sedimentated being recycled to said previous stage propylene polymerization vessel.

BRIEF DESCRIPTION OF THE DRAWINGS

- A: reactors for polymerization of propylene;
- $A_1$: first reactor for polymerization of propylene;
- $A_2$: second reactor for polymerization of propylene;
- B: liquid cyclone;
- $B_1$: first liquid cyclone;
- $B_2$: second liquid cyclone;
- C: hydraulic sedimentation classifier;
- $C_1$: first hydraulic sedimentation classifier;
- $C_2$: second hydraulic sedimentation classifier;
- D: reactor for copolymerization of propylene and ethylene;
- 1: catalyst-feed pipe;
- 2: propylene-feed pipe;
- 3, 3': slurry discharge pipe;
- 4, 4': supernatant discharge pipe;
- 5, 5': concentrated polypropylene slurry discharge pipe;
- 6, 6': discharge pipe of hydraulic sedimentation classifier;
- 7, 7': discharge pipe of hydraulic sedimentation classifier;
- 8, 8': ethylene feed pipe;
- 9: propylene feed pipe;
- 10: polymer discharge pipe;
- 11: halogenated aluminum compound feed pipe.

DETAILED DESCRIPTION OF THE PREFERRED EMBODIMENTS

A classification step has been introduced in the process of producing a propylene-ethylene block copolymer between a propylene polymerization step and a successive step of copolymerization of propylene and ethylene.

The classification system introduced for the above purpose comprises an assembly of a concentrator and a hydraulic sedimentation classifier. The concentrator separates the polypropylene slurry obtained from a propylene polymerization into a concentrated slurry and a supernatant liquid. The hydraulic sedimentation classifier then countercurrently recontacts said concentrated slurry with said supernatant liquid.

In the present invention, wherein a propylene-ethylene block copolymer is produced in a multi-stage polymerization, a polymerization can be conducted either by a slurry polymerization using a solvent of an inert hydrocarbon such as hexane, heptane, etc., or by a bulk polymerization in which an olefine or olefines are polymerized without using an inert solvent (a slurry polymerization in which an olefine itself is used as a solvent).

In this invention, propylene is polymerized in the presence of a catalyst for propylene polymerization in a previous stage.

The propylene polymerization catalyst used in the present invention is not limited as far as it can produce an isotactic polypropylene in a good yield.

A Ziegler-Natta type catalyst comprising $TiCl_3$ and an organoaluminum compound can generally be used.

Especially preferable catalyst is a solid $TiCl_3$ type catalyst complex of which aluminum content is lower than 0.15 as the atomic ratio of aluminum to titanium and containing a complexing agent.

An organo aluminum compound can be triethyl aluminum, diethyl aluminum chloride, dipropyl aluminum chloride, etc.

If necessary, an electron donor, an aromatic compound, etc. can be used as a third component of the catalyst.

$TiCl_3$ can be used for the polymerization as it is, but it can preferably be used after being subjected to a previous treatment (previous polymerization) in which $TiCl_3$ is treated with a small amount of propylene (0.5–50 g per 1 g $TiCl_3$) in the presence of an organoaluminum compound.

In general, when propylene is polymerized in a multi-stage operation including 2 or more stages, an advantageous result is obtained because the content of catalyst grains which have not given any contribution to the polymerization, or small polymer grains which have not yet grown up to a sufficient polymer, in the resulting polymer can be reduced.

However, in this invention, the propylene polymerization can usually be conducted at a single stage because of the superiority of the classification system of the present invention.

The propylene polymerization of this invention means both a homo-polymerization of propylene and a co-polymerization of propylene and a small amount of another olefine.

The residence time and the temperature of the polymerization are selected in such a manner that the resulting polypropylene amounts 60–95, preferably 70–90% by weight based on the total production of polymer.

The polymerization temperature is usually selected from the range of 40°–100° C., preferably 55°–80° C.

The polymerization pressure can usually be 1–50 $Kg/cm^2$, preferably 5–40 $Kg/cm^2$.

The polypropylene produced in the previous stage is discharged from the reactor at a concentration of the slurry of 5 to 60 wt. % preferably 20 to 50 wt. %, and is fed into the concentrator. The slurry of polypropylene fed into the concentrator is separated into a concentrated slurry of polypropylene and a supernatant. The concentration of the concentrated slurry of polypropylene is controlled in a range of 5 to 75 wt. % preferably 20 to 70 wt. %. The concentration of the polymer grains in the supernatant is preferably low and is usually 0.5 wt. % or lower especially in a range of 0.001 to 0.1 wt. %. The ratio of the concentrated slurry of polypropylene to the supernatant is depending upon the property of the slurry of polypropylene and the performance of the concentrator and is usually in a range of 50:50 to 99:1 by weight.

The concentrator used in the process of the present invention can be a liquid cyclone, a centrifugal separator, and a filter. The liquid cyclone is especially preferable because of easy operation in the continuous operation, compact and economical and small area of installation. When a plurality of the concentrators are connected in series to feed a supernatant of the first concentrator to the second concentrator, the concentration of grains in the supernatant discharged from the second concentrator can be further reduced to increase the effect of classification by the hydraulic sedimentation classifier.

It is unnecessary to consider a special form of the liquid cyclone. It is preferable to consider a size to give smaller grain sizes in the classification. A slurry feed pipe preferably has a diameter for a slurry feed linear velocity of 1 m/sec. or higher especially 3 m/sec. or higher. The liquid cyclone preferably has smaller diameter of an inner cylinder as far as a pressure loss is allowable.

The concentrated slurry of polypropylene and the supernatant discharged from the concentrator are respectively fed to the upper part and the lower part of the hydraulic sedimentation classifier to countercurrently contact them in the classifier. The polypropylene sedimented by the countercurrent contact is discharged from the bottom of the classifier and is fed into the subsequent propylene polymerization vessel or the vessel for copolymerization of propylene and ethylene. The polypropylene remained without the sedimentation is discharged from the upper part of the classifier and is returned to the previous vessel for polymerization of propylene. A ratio of the slurry returned to the previous vessel for polymerization of propylene to the slurry fed into the vessel for copolymerization of propylene and ethylene is in a range of 30:70 to 99:1 preferably 50:50 to 98:2 by weight.

The hydraulic sedimentation classifier is not critical and preferably has a ratio of a length of the cylinder to a diameter of 2 or more and has a tapered bottom connected to the lower part of the cylinder.

The residence time of the slurry of polypropylene in the classifier is depending upon a capacity of the classifier and a rate of the discharge of the slurry of polypropylene in the hydraulic sedimentation and is usually 1 min. or longer preferably 3 min. or longer and is decided by the capacity of the classifier or the rate of discharge.

The classification system of the present invention can be placed between the propylene polymerization vessel and the vessel for copolymerization of propylene and ethylene and it can also be placed between the two propylene polymerization vessels in the case that the propylene polymerization is conducted by using multistage reactors.

The polypropylene slurry hydraulicly sedimentated in the hydraulic sedimentation classifier is then supplied to the vessel for a copolymerization of propylene and ethylene, which can be composed of one or more than two reactors.

The concentration of propylene in the gaseous phase of the copolymerization of propylene and ethylene is selected from the range of 25-90, preferably 50-85% by mole based on the total moles of propylene and ethylene in the gaseous phase so as to obtain a polymer having good impact strength.

The polymerization temperature can be selected from the range of 25°-75° C., preferably 25°-65° C.

The polymerization pressure can usually be 1-50 Kg/cm², preferably 5-40 Kg/cm².

The amount of the propylene-ethylene copolymer obtained will be 1-20, preferably 2-15% by weight based on the total production of polymer.

The propylene-ethylene block copolymer of the present invention has a high crystallinity and a good impact strength and these characteristics can be remarkably improved by addition of a certain organoaluminum compound during the copolymerization of ethylene and propylene.

The specific aluminum compound added in the copolymerization step has the formula $$AlR_n^2X_{3-n}$$

($R^2$ represents a $C_{1-20}$ hydrocarbon moiety; X represents a halogen atom especially chlorine atom and n is $1.5 \geq n \geq 0$). It is preferable to use an aluminum sesquichloride ($AlR_{1.5}^2Cl_{1.5}$), an ethylaluminum dichloride ($AlR^2Cl_2$) or a mixture thereof.

These compounds can usually be added in an amount of 0.01-0.50 times moles based on the organoaluminum compound which is used in the first stage propylene polymerization.

When the amount of addition of the compound is too small, sufficient effect can not be obtained.

When an excess amount of the compound is added, the activity of the catalyst in the copolymerization decreases to such extent, that the desirable polymer composition can not be obtained.

This invention will now be illustrated by referring to the drawings.

FIGS. 1 to 5 are flow diagrams of one embodiment for producing a propylene-ethylene block copolymer of the present invention.

Figure 1:
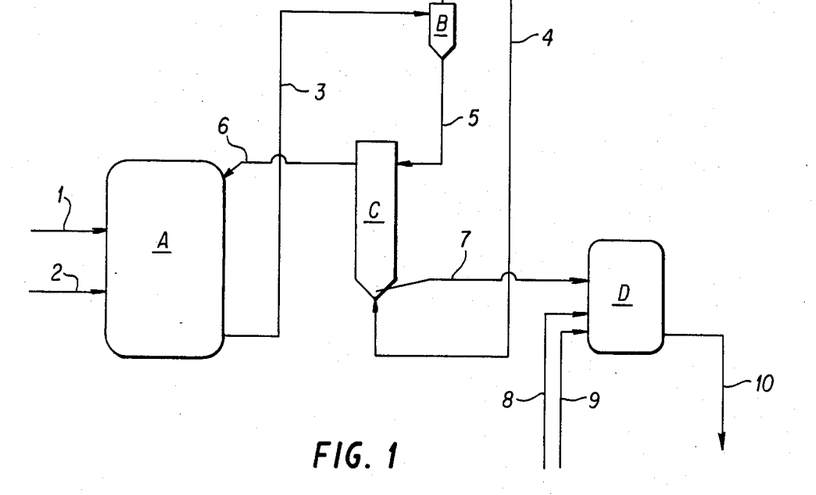
FIGS. 1 to 4 respectively show flow diagrams employing a classification system.

FIG. 1 is a flow diagram of the embodiment placing a classification system between the reactor for polymerization of propylene and the reactor for copolymerization of propylene and ethylene. This embodiment will be illustrated by referring to FIG. 1.

A catalyst for polymerization of propylene is fed through the catalyst feed pipe (1) into the reactor for polymerization of propylene A and a liquid propylene is fed through the propylene feed pipe (2) into the reactor A to perform the polymerization of propylene. The resulting slurry of polypropylene is discharged from the reactor A and is fed through the slurry discharge pipe (3) to the liquid cyclone B. In the liquid cyclone B, it is separated into the concentrated slurry of polypropylene and the supernatant. The concentrated slurry of polypropylene is discharged from the bottom of the liquid cyclone B and is fed through the concentrated polypropylene slurry discharge pipe (5) to the upper part of the hydraulic sedimentation classifier C. On the other hand, the supernatant is discharged from the upper part of the liquid cyclone B and is fed through the supernatant discharge pipe (4) to the lower part of the hydraulic sedimentation classifier C. The concentrated slurry of polypropylene and the supernatant are countercurrently contacted in the classification cylinder of the hydraulic sedimentation classifier C and the polypropylene sedimented by the contact is discharged from the bottom of the hydraulic sedimentation classifier C and is fed through the discharge pipe (7) to the reactor for copolymerization of propylene and ethylene D. On the other hand, the polypropylene remained (not sedimented) by the hydraulic sedimentation is discharged from the upper part of the hydraulic sedimentation classifier C and is returned through the discharge pipe (6) to the reactor for polymerization of propylene A. Into the reactor for copolymerization of propylene and ethylene D, the polypropylene obtained by the hydraulic sedimentation is fed and ethylene and if necessary, additional propylene are respectively fed through the ethylene feed pipe (8) and the propylene feed pipe (9) to perform the copolymerization of propylene and ethylene, if necessary the co-catalyst can be additionally added in this stage.

The resulting block copolymer of propylene and ethylene is discharged from the polymer discharge pipe (10) and is used as a product.

Figure 2:
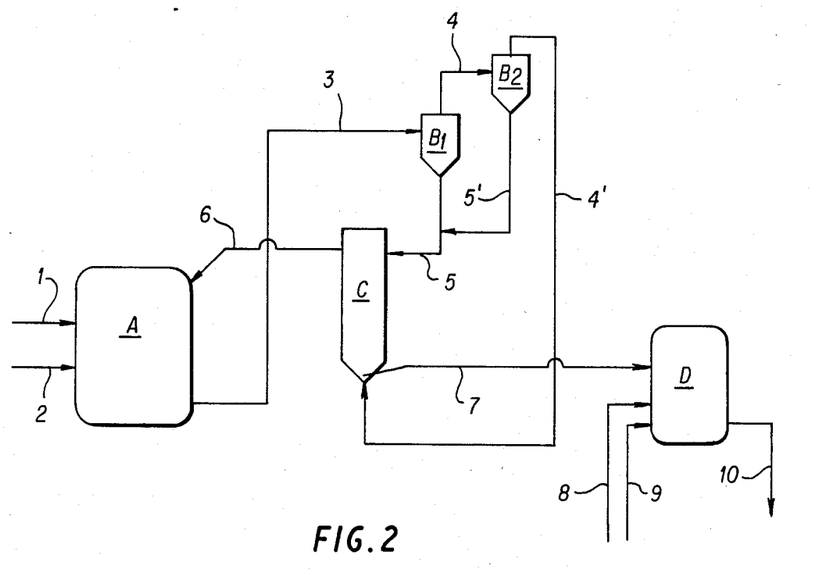

FIG. 2 is a flow diagram of the embodiment using two liquid cyclones connected in series in the classification system. The supernatant discharged from the first liquid cyclone B₁ is fed to the second liquid cyclone B₂. In the second liquid cyclone B₂, the fine grains contained in the supernatant discharged from the first liquid cyclone $B_1$ are further separated to obtain the supernatant which does not substantially contain polypropylene grains. The supernatant is fed through the supernatant discharge pipe (4') to the hydraulic sedimentation classifier C. When two liquid cyclones are used, a concentration of grains in the supernatant fed from the second liquid cyclone $B_2$ to the hydraulic sedimentation classifier C is almost zero and the effect for classification in the hydraulic sedimentation classifier is increased. Thus, the fine grains of polypropylene fed to the reactor for co-polymerization of propylene and ethylene can be extremely reduced.

Figure 3:
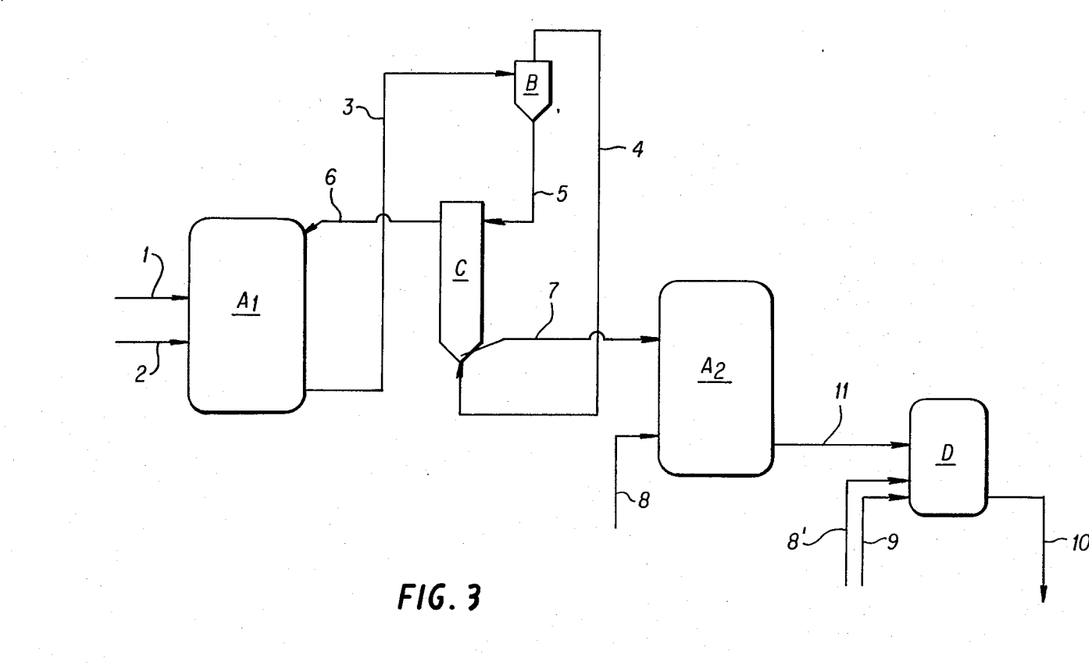

FIG. 3 is a flow diagram of the embodiment polymerizing propylene in two reactors and placing a classification system between the two reactors.

Figure 4:
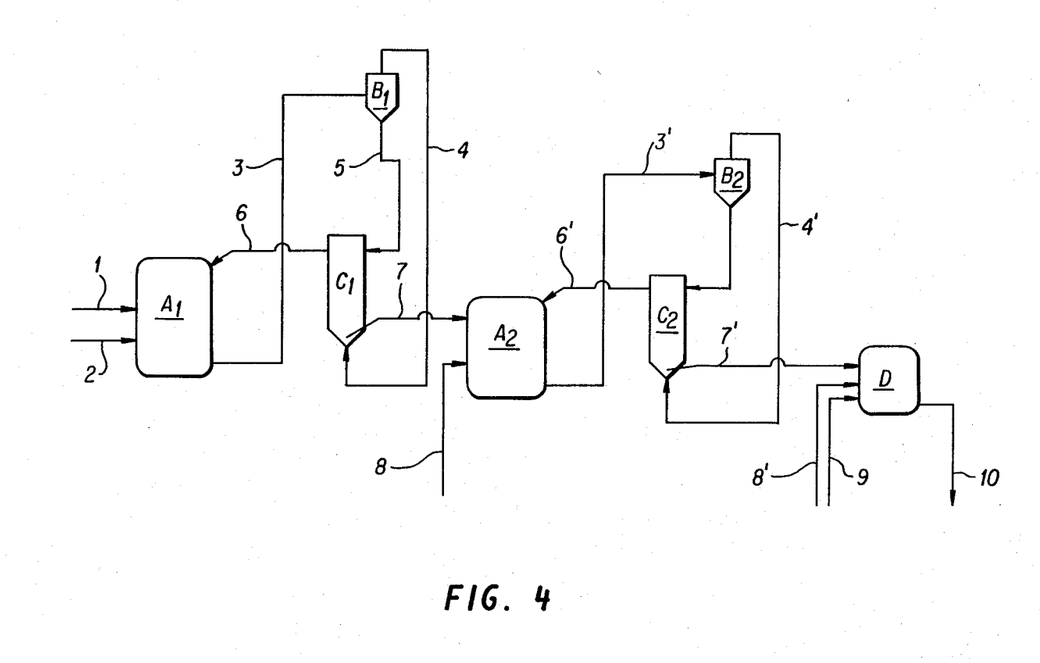

FIG. 4 is a flow diagram of the embodiment placing two classification systems between the two reactors for polymerization of propylene and between the reaction for polymerization of propylene and the reactor of co-polymerization of propylene and ethylene.

Figure 5:
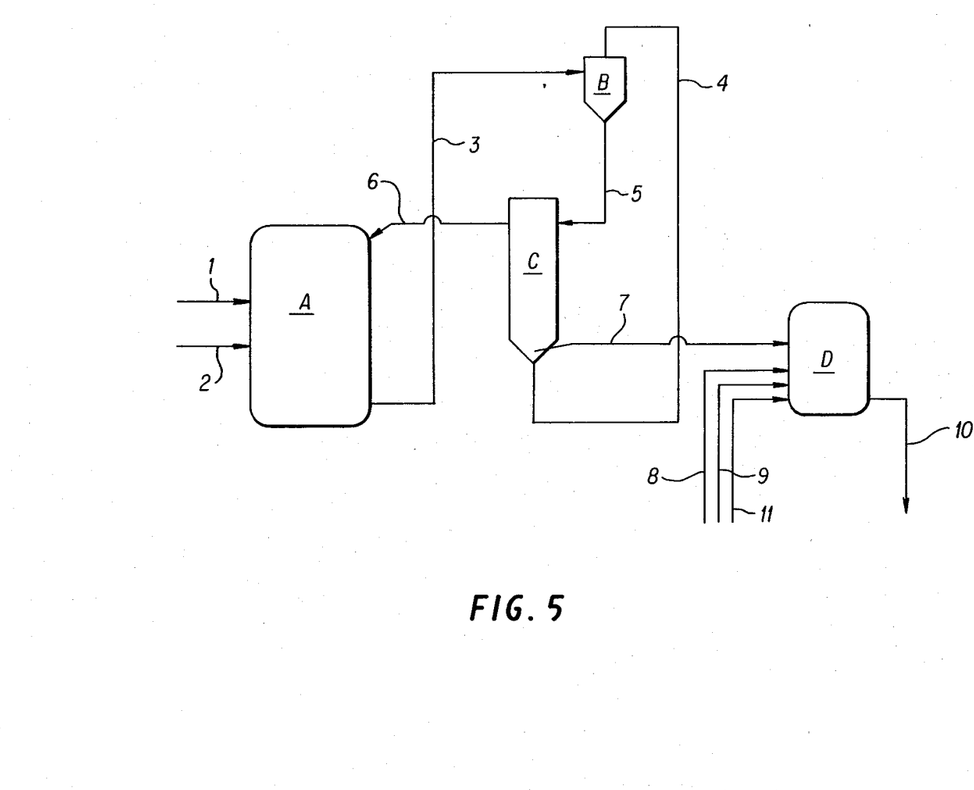

FIG. 5 is a flow diagram of the embodiment feeding the specific aluminum halide compound through the aluminum halide compound feed pipe (11) to the reactor for copolymerization of propylene and ethylene.

In FIGS. 3 to 5, the references A, B, C, D, 1, 2, 3, 4 - - - designate the identical parts shown in FIGS. 1 and 3.

The invention will be further illustrated by certain Examples and References which are provided herein for purpose of illustration only and are not intended to be limiting in any manner unless otherwise specified.

In the Examples, the measurements are as follows.

A melt flow index MFI (g./10 min.) is measured by ASTM D-1238-70 at 230° C. under a pressure of 2.16 kg. as a rate of the extrusion.

A brittle point temperature $T_b$ (°C.) is measured in the direction of flow of a molten resin (MD) and in the perpendicular direction (TD) pursuant to ASTM D-746 by using a specimen obtained by punching a flat sheet having a thickness of 2.0 mm.

EXAMPLE 1

(A) Preparation of Catalyst

Into a 10 liter autoclave purged with nitrogen, 5.0 l of n-hexane and 3.0 mol. of titanium tetrachloride were charged and 2.7 mol. of di-n-octyl ether was added. The mixture was stirred at 25° C. and a solution of 1.0 mol. of diethylaluminum monochloride in 0.5 l of n-hexane was added dropwise to obtain a homogeneous solution of titanium trichloride in n-hexane in greenish black-brown color. The solution of titanium trichloride was heated to 95° C. During the heating, a formation of purple precipitate of titanium trichloride was found. After stirring the reaction mixture at 95° C. for 1 hour, the precipitate was filtered and repeatedly washed with n-hexane to obtain fine powdery solid titanium trichloride type catalytic complex.

Into a 20 liter autoclave purged with nitrogen, 12.5 l of n-hexane was charged and stirred and 1.6 mol. of di-n-ethylaluminum monochloride and the solid titanium trichloride type catalytic complex obtained by the step (A) were charged to give 250 g. of $TiCl_3$ component. Then, the temperature in the autoclave was controlled to 30° C. and propylene gas was fed with stirring at the same temperature until polymerizing 1,250 g. of propylene. The resulting precipitate was separated and repeatedly washed with n-hexane to obtain a polypropylene-containing titanium trichloride.

(B) Preparation of block copolymer of propylene and ethylene

A reactor having a capacity of 1.6 m³ and a reactor having a capacity of 0.6 m³ were connected through a classification system in series. The classification system is a combination of a liquid cyclone (a ratio of length to diameter of 2 and a ratio of taper part to diameter of 3) and a hydraulic sedimentation classifier (a ratio of length to diameter of 7 and a ratio of bottom taper part to diameter of 1.2). The first reactor was used for a homopolymerization of propylene and the second reactor was used for a copolymerization of propylene and ethylene to continuously produce a propylene-ethylene block copolymer. (See FIG. 1)

Into the first reactor, liquid propylene, hydrogen and the catalyst were continuously fed to perform a bulk polymerization. The catalyst was a combination of polypropylene-containing titanium trichloride obtained in Preparation of catalyst (A) and diethylaluminum chloride at a molar ratio of diethylaluminum chloride to $TiCl_3$ of 3. A polymerization temperature was 70° C. and a polymerization pressure of 33 kg./cm²G and a vapor phase hydrogen concentration was 5.5 mol % and an average residence time was 4 hours. The level was controlled to maintain in a volume of 1 m³.

A slurry of polypropylene discharged from the reactor for polymerization of propylene had a polymer concentration of about 45 wt. %. The slurry was fed by a pump at a rate of about 10 m³/hr (linear velocity of 5.7 m/sec.) to a liquid cyclone. From the upper part of the cyclone, a supernatant having a grain concentration of about 0.002 wt. % was discharged. From the bottom of the cyclone, a concentrated slurry having a solid concentration of about 48.7 wt. % was discharged. The supernatant was fed to the lower part of the hydraulic sedimentation classifier at a rate of 1.0 m³/HR and the concentrated slurry was fed to the upper part of the classifier at a rate of 9.0 m³/HR. The slurry discharged from the classifier had a solid concentration of about 45 wt. % and was returned at a rate of 9.75 m³/HR to the first reactor (reactor for polymerization of propylene) and the slurry discharged from the bottom of the classifier had a solid concentration of about 45 wt. % and was fed at a rate of 0.25 m³/HR to the second reactor (reactor for copolymerization). A ratio of the slurry (fine grains-containing slurry) returned to the first reactor to the slurry (coarse grain slurry) fed into the second reactor was 97.5:2.5 by weight.

Into the reactor for copolymerization, ethylene, liquid propylene and hydrogen were fed at a vapor phase propylene concentration of 60–65 mol % and a hydrogen concentration to the sum of ethylene and propylene of 3 mol %. A polymerization temperature was 40° C. and a polymerization pressure was kept in 28 kg./cm²G. The propylene-ethylene random copolymer was produced at a ratio of the copolymer to the final polymer product of 13.5 wt. %.

The resulting slurry of polymer was flushed to purge the unreacted propylene and the product was treated with methanol gas and dried to produce a powdery polymer at a productivity of about 69 kg./hr.

The resulting polymer was admixed with 0.2 wt. % of BHT (2,6-di-tert.-butyl-p-cresol) and was pelletized by using a uniaxial extruding machine having an inner diameter of 40 mm and was sheeted to form a flat sheet having a thickness of 2 mm and a size of 100×100 mm by a small injection molding machine. The final polymer product had a melt flow index of 2.5 (melt flows index of the copolymer of 0.001) and a brittle point temperature of −25° C. in MD direction and −20° C. in TD direction. A few gels were found by visual inspection of the flat sheet.

EXAMPLE 2

The systems of Example 1 were used. In accordance with the process of Example 1, except the average residence time was varied 2.0 hours. A slurry of propylene had a polymer concentration of about 30 wt. %. The slurry was discharged from the first reactor and fed by a pump at a rate of about 10 m$^3$/HR to a liquid cyclone.

From the upper part of the liquid cyclone, a supernatant having a grain concentration of about 0.002 wt. % was discharged at a rate of 2.0 m$^3$/HR. From the bottom of the cyclone, a concentrated slurry having a solid concentration of about 36 wt. % was discharged at a rate of 8.0 m$^3$/HR. The supernatant was fed to the lower part of the hydraulic sedimentation classifier and the concentrated slurry was fed to the upper part of the hydraulic sedimentation classifier.

The slurry discharged from the classifier had a solid concentration of about 30 wt. % and was returned at a rate of 9.5 m$^3$/HR to the first reactor (reactor for polymerization of propylene) and the slurry discharged from the bottom of the classifier had a solid concentration of about 30 wt. % and was fed at a rate of 0.5 m$^3$/HR to the second reactor (reactor for copolymerization). A ratio of the slurry (fine grains-containing slurry) returned to the first reactor to the slurry (coarse grain slurry) fed into the second reactor was 95:5 by weight.

In accordance with the copolymerization of Example 1, the propylene-ethylene random copolymer was produced at a ratio of the copolymer to the final polymer product of 14 wt. %.

The resulting slurry of polymer was flushed to purge the unreacted propylene and the product was treated with methanol gas and dried to produce a powdery polymer at a productivity of about 84 kg./HR.

The resulting polymer was treated in the same manner in Example 1 and was pelletized by using a uniaxial extruding machine and was sheeted to form a flat sheet having a thickness of 2 mm and a size of 100×100 mm by a small injection molding machine. The final polymer product had a melt flow index of 2.2 and a brittle point temperature of −24° C. in MD direction and −18° C. in TD direction.

Only 10 gels were found by visual inspection of the flat sheet.

EXAMPLE 3

In accordance with the process of Example 1, the discharge of the slurry of polypropylene from the first reactor was reduced 1.2 m$^3$/HR and the liquid cyclone and the hydraulic sedimentation classifier were replaced with similar devices each having ⅓ the capacity of the original container and the average residence time in the first reactor was varied to 2 hours. A supernatant having a grain concentration of about 0.01 wt. % was discharged from the upper part of the liquid cyclone at a rate of 0.6 m$^3$/HR and a concentrated slurry having a solid concentration of 42.4 wt. % was discharged from the bottom of the liquid cyclone at a rate of 0.6 m$^3$/HR. The supernatant was fed to the lower part of the hydraulic sedimentation classifier and the concentrated slurry was fed to the upper part of the classifier. The slurry discharged from the upper part of the classifier had a solid concentration of about 30 wt. % and was returned to the first reactor (reactor for polymerization of propylene) at a rate of 0.7 m$^3$/HR. The slurry discharged from the bottom of the classifier had a solid concentration of 30 wt. % and fed into the second reactor (reactor for copolymerization) at a rate of 0.5 m$^3$/HR. A ratio of the slurry returned to the first reactor (fine grains-containing slurry) to the slurry fed to the second reactor (coarse grain slurry) was 58:42 by weight.

In accordance with the process of Example 1 the propylene-ethylene random copolymer was produced at a ratio of the copolymer to the final polymer product of 14 wt. %, a copolymerization was carried out in the reactor for copolymerization to obtain a powdery polymer at a productivity of 84 kg./HR.

The resulting polymer was treated in the same manner of Example 1 was pelletized by using a uniaxial extruding machine and was sheeted to form a flat sheet having a thickness of 2 mm and a size of 100×100 mm by a small injection molding machine. The final polymer product had a melt flow index of 2.0 and a brittle point temperature of −24° C. in MD direction and −16° C. in TD direction.

Fifty gels were found by visual inspection of the flat sheet.

REFERENCE 1

In accordance with the process of Example 1, the discharge of the slurry of propylene from the first reactor was varied 0.5 m$^3$/hr and the slurry was fed to the liquid cyclone.

A concentrated slurry was discharged from the bottom of the liquid cyclone and fed directly to the second reactor (reactor for copolymerization) without passing through the hydraulic sedimentation classifier. The supernatant was fed to the first reactor.

The resulting polymer was treated in the same manner of Example 1. More than a thousand gels were found by visual inspection of the flat sheet. A brittle point temperature was −14° C. in MD direction and +9° C. higher in TD direction.

EXAMPLE 4

In accordance with the process of Example 1, propylene homopolymer was produced in the first step.

A slurry of polypropylene discharged from the reactor for polymerization of propylene had a polymer concentration of about 45 wt. %. The slurry was fed by a pump at a rate of about 5 m$^3$/hr to a liquid cyclone. From the upper part of the cyclone, a supernatant having a grain concentration of about 0.002 wt. % was discharged. From the bottom of the cyclone, a concentrated slurry having a solid concentration of about 53 wt. % was discharged. The supernatant was fed to the lower part of the hydraulic sedimentation classifier at a rate of 1.0 m$^3$/HR and the concentrated slurry was fed to the upper part of the classifier at a rate of 4.0 m$^3$/HR. The slurry discharged from the classifier had a solid concentration of about 45 wt. % and was returned at a rate of 4.75 m$^3$/HR to the first reactor (reactor for polymerization of propylene) and the slurry discharged from the bottom of the classifier had a solid concentration of about 45 wt. % and was fed at a rate of 0.25 m$^3$/HR to the second reactor (reactor for copolymerization). A ratio of the slurry (fine grains-containing slurry) returned to the first reactor to the slurry (coarse grain slurry) fed into the second reactor was 95:5 by weight.

Into the reactor for copolymerization, ethylene, liquid propylene and hydrogen were fed at a vapor phase propylene concentration of 60–65 mol % and a hydrogen concentration to the sum of ethylene and propylene of 3 mol %. Ethylaluminum dichloride was continuously fed at a molar ratio of ethylaluminum dichloride to diethylaluminum chloride charged in the first reactor of 0.08. A polymerization temperature was 45° C. and an average residence time was 1.5 hr. and a polymerization pressure was kept in 30 kg./cm$^2$G. The propylene-ethylene random copolymer was produced at a ratio of the copolymer to the final polymer product of 13.5 wt. %.

The resulting slurry of polymer was flushed to purge the unreacted propylene and the product was treated with methanol gas and dried to produce a powdery polymer at a productivity of about 69 kg./HR.

The resulting polymer was admixed with 0.2 wt. % of BHT and was pelletized by using a uniaxial extruding machine having an inner diameter of 40 mm and was sheeted to form a flat sheet having a thickness of 2 mm and a size of 100×100 mm by a small injection molding machine. The final polymer product had a melt flow index of 2.5 (melt flows index of the copolymer was 0.001) and a brittle point temperature of −25° C. in MD direction and −17° C. in TD direction. Any formation of gel was not found in vision of the flat sheet.

Fine gels which are not observed are counted by forming a film having a thickness of 30μ by a die having a diameter of 100 mm and cutting the film in a size of 250 cm$^2$ and counting a total number of fine gels by macrophotography. The number of the fine gels is shown by the following ratings.

| Rating | Number of fine gels |
|--------|---------------------|
| O      | less than 50 |
| Δ      | 50 or more and less than 300 |
| X      | 300 or more and less than 2,000 |
| X X    | 2,000 or more |

The fine gel was evaluated by the tester to find only 40 gels.

EXAMPLE 5

The systems of Example 4 were used. In accordance with the process of Example 4 except controlling a molar ratio of ethylaluminum dichloride to diethylaluminum monochloride charged in the first reactor to 0.16 and varying an average residence time to 1.8 hours so as to give a ratio of the copolymer to the final polymer product of 13.5 wt. % a polymerization and tests were carried out. The results are shown in Table 1.

EXAMPLE 6

The systems of Example 4 were used. In accordance with the process of Example 4 except charging ethylaluminum sesquichloride instead of ethylaluminum dichloride at a molar ratio of ethylaluminum sesquichloride to diethylaluminum monochloride charged in the first reactor of 0.21 and varying an average residence time to 1.8 hours so as to give a ratio of the copolymer to the final polymer product of 13.5 wt. % a polymerization and tests were carried out. The results are shown in Table 1.

EXAMPLE 7

In accordance with the process of Example 4, the rate of the discharge of the slurry of polypropylene from the first reactor was reduced to 1.2 m$^3$/HR and the liquid cyclone and the hydraulic sedimentation classifier were replaced to similar devices having each capacity of ½ and the average residence time in the first reactor was varied to 2 hours. A supernatant having a grain concentration of about 0.01 wt. % was discharged from the upper part of the liquid cyclone at a rate of 0.6 m$^3$/HR and a concentrated slurry having a solid concentration of 42.4 wt. % was discharged from the bottom of the liquid cyclone at a rate of 0.6 m$^3$/HR. The supernatant was fed to the lower part of the hydraulic sedimentation classifier and the concentrated slurry was fed to the upper part of the classifier. The slurry discharged from the upper part of the classifier had a solid concentration of about 30 wt. % and was returned to the first reactor (reactor for polymerization of propylene) at a rate of 0.7 m$^3$/HR. The slurry discharged from the bottom of the classifier had a solid concentration of 30 wt. % and fed into the second reactor (reactor for copolymerization) at a rate of 0.5 m$^3$/HR. A ratio of the slurry returned to the first reactor (fine grains-containing slurry) to the slurry fed to the second reactor (course grain slurry) was 58:42 by weight.

In accordance with the process of Example 4 except controlling ethylaluminum dichloride to give a molar ratio of ethylaluminum dichloride to diethylaluminum monochloride charged in the first reactor of 0.16 and varying a polymerization temperature to 40° C. so as to give a ratio of the copolymer to the final polymer product of 14 wt. %, a copolymerization was carried out in the reactor for copolymerization to obtain a powdery polymer at a productivity of 84 kg./HR and tests were carried out. The results are shown in Table 1.

TABLE 1

|  | Exp. 4 | Exp. 5 | Exp. 6 | Exp. 7 |
|---|---|---|---|---|
| Condition of classification: | | | | |
| flow rate of ③ (m$^3$/HR) | 5 | 5 | 5 | 1.2 |
| solid concentration of ③ (wt. %) | 45 | 45 | 45 | 30 |
| flow rate of ④ (m$^3$/HR) | 1.0 | 1.0 | 1.0 | 0.6 |
| solid concentration of ④ (wt. %) | 0.002 | 0.002 | 0.002 | 0.01 |
| flow rate of ⑥ (m$^3$/HR) | 4.75 | 4.75 | 4.75 | 0.7 |
| flow rate of ⑦ (m$^3$/HR) | 0.25 | 0.25 | 0.25 | 0.5 |
| ratio of flow rate ⑥/⑦ (wt: ratio) | 95/5 | 95/5 | 95/5 | 58/42 |
| Condition of copolymerization: | | | | |
| Additional aluminum halide | | | | |
| Kind | EADC[1] | EADC | EASC[2] | EADC |
| Amount (molar ratio) | 0.08 | 0.16 | 0.21 | 0.16 |
| Polymerization temperature (°C.) | 45 | 45 | 45 | 40 |
| Residence time (HR) | 1.5 | 1.8 | 1.8 | 1.5 |
| Ratio of copolymer to final polymer (wt. %) | 13.5 | 13.5 | 13.5 | 14 |
| Productivity (kg./HR) | 69 | 69 | 69 | 84 |
| Result: | | | | |
| MFI (g/10 min.) | 2.5 | 2.3 | 2.2 | 2.2 |
| $T_b$ | | | | |
| MD direct (°C.) | −25 | −27 | −24 | −29 |

TABLE 1-continued

| | Exp. 4 | Exp. 5 | Exp. 6 | Exp. 7 |
|---|---|---|---|---|
| TD direct. (°C.) | −17 | −19 | −17 | −15 |
| Fine gels | ◯ | ◯ | ◯ | ◯ |

[1] EADC: ethylaluminum dichloride
[2] EASC: ethylaluminum sesquichloride

What is claimed as new and desired to be secured by Letters Patent of the United States is:

1. In a process for producing a propylene-ethylene block copolymer by a continuous multi-stage polymerization comprising a first stage in which propylene is polymerized in a first polymerization vessel in the presence of a propylene polymerization catalyst, and a second stage in which propylene and ethylene are copolymerized in a second polymerization vessel, wherein:

the polypropylene slurry discharged from the first polymerization vessel is supplied to a concentrator to separate said slurry into a concentrated polypropylene slurry and a supernatant liquid;

the concentrated polypropylene slurry is then introduced through an upper part of a hydraulic sedimentation classifier to be countercurrently contacted with the upward flowing supernatant fluid introduced through a lower part of said classifier to obtain hydraulically sedimented polypropylene and not hydraulically sedimented polypropylene;

the thus obtained hydraulically-sedimented polypropylene is then supplied to the second polymerization vessel or to a further propylene polymerization vessel; and the not hydraulically sedimented polypropylene is then recycled from the classifier to the first polymerization vessel.

2. The process of producing the block copolymer according to claim 1 wherein said concentrator is a hydraulic cyclone.

3. The process of producing the block copolymer according to claim 1 wherein said hydraulic sedimentation classifier has a form of cylindrical part and a tapered bottom connected to the lower part of the cylindrical part.

4. The process for producing the block copolymer according to claim 1 wherein said propylene polymerization is conducted in a single stage.

5. The process for producing the block copolymer according to claim 1 wherein a ratio of a slurry returned from said classification system to the previous stage to a slurry fed to the subsequent stage is in the range of 30:70 to 99:1 by weight.

6. The process for producing the block copolymer according to claim 1 wherein a ratio of a concentrated polypropylene slurry to a supernatant liquid is in the range of 50:50 to 99:1 by weight.

7. The process for producing the block copolymer according to claim 1 wherein a halogenoaluminum compound having the formula $$AlR_n^2X_{3-n}$$

(wherein $R^2$ represents a $C_{1-20}$ hydrocarbon moiety, X represents a halogen atom and n is a number of $1.5 \geq n \geq 0$) is newly added to said copolymerization stage.

* * * * *